Figure 3A:
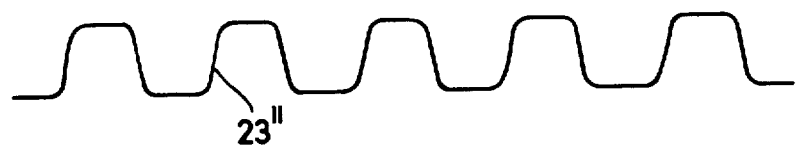

United States Patent [19]

Dashwood et al.

[11] 4,208,589
[45] Jun. 17, 1980

[54] OPTICAL SCANNER

[75] Inventors: Nigel J. R. Dashwood, Royston; Dexter R. Plummer, Ongar, both of England

[73] Assignee: Schumag GmbH, Aachen, Fed. Rep. of Germany

[21] Appl. No.: 871,858

[22] Filed: Jan. 24, 1978

[30] Foreign Application Priority Data

Jan. 25, 1977 [GB] United Kingdom ................ 2904/77

[51] Int. Cl.² ......................................... G01N 21/30
[52] U.S. Cl. ................................. 250/560; 250/235; 356/387
[58] Field of Search ................ 250/560, 216, 234, 235, 250/236, 237 G; 356/158, 159, 160

[56] References Cited

U.S. PATENT DOCUMENTS

| | | | |
|---|---|---|---|
| 3,615,139 | 10/1971 | Bostrom | 356/160 |
| 3,744,915 | 7/1973 | Sick | 356/160 |
| 3,856,412 | 12/1974 | Zanoni | 250/560 |
| 4,074,938 | 2/1978 | Taylor | 250/560 |

Primary Examiner—David C. Nelms
Attorney, Agent, or Firm—Herbert L. Lerner

[57] ABSTRACT

Optical scanner with a light beam reciprocated parallel to itself includes a stationary inlet for the light beam, an elongated first prism having a parallelogram shape disposed downstream from the stationary inlet in travel direction of the light beam, the first prism extending transversely to the light beam and having an inlet end through which the light beam is admitted to the first prism and twice reflected therein, the first prism having an outlet end from which the light beam leaves the first prism in a direction parallel to the direction in which it is admitted through the inlet end to the first prism, a second prism similar to the first prism having an inlet end disposed downstream of the outlet end of the first prism in travel direction of the light beam, the second prism having an outlet end determining respective location for the light beam leaving the scanner during a scanning operation, a first rotating carrier for the first prism having a mathematical rotary axis extending in the same direction as that of the light beam being admitted to the first prism through the inlet end of the first prism, and a second carrier rotating at the same rotary speed as the first carrier and counter thereto, the second carrier having a mathematical rotary axis extending in the same direction as that of the light beam leaving the first prism through the outlet end of the first prism and rotating together with the outlet end of the first prism about the rotary axis of the first rotating carrier.

21 Claims, 6 Drawing Figures

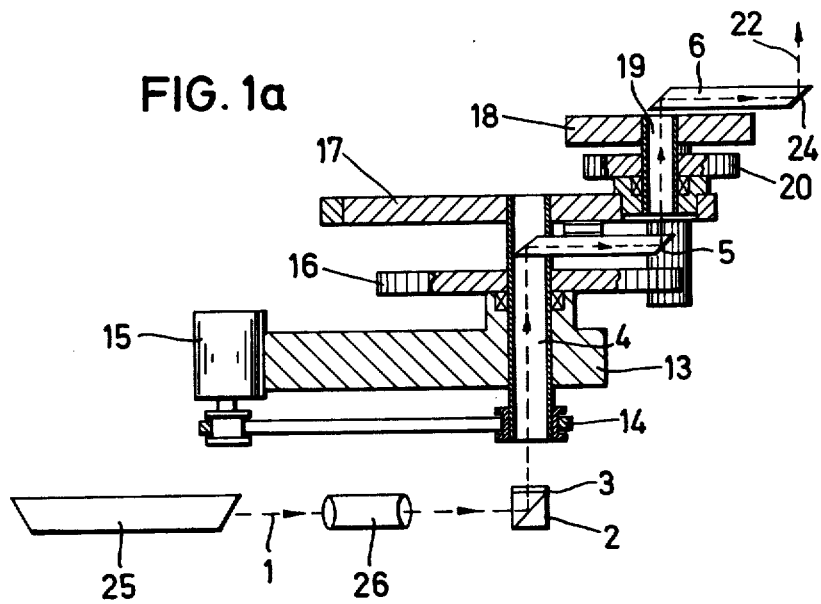
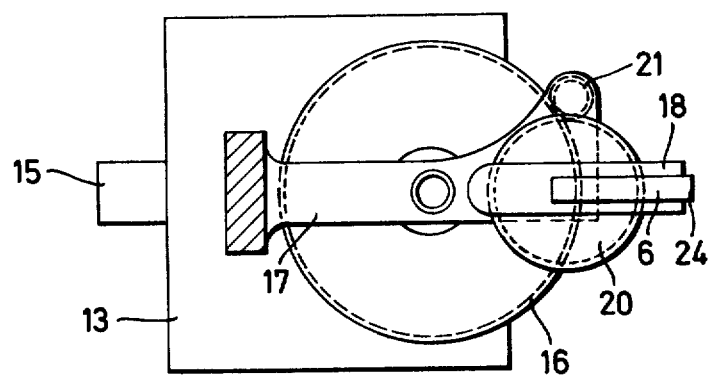

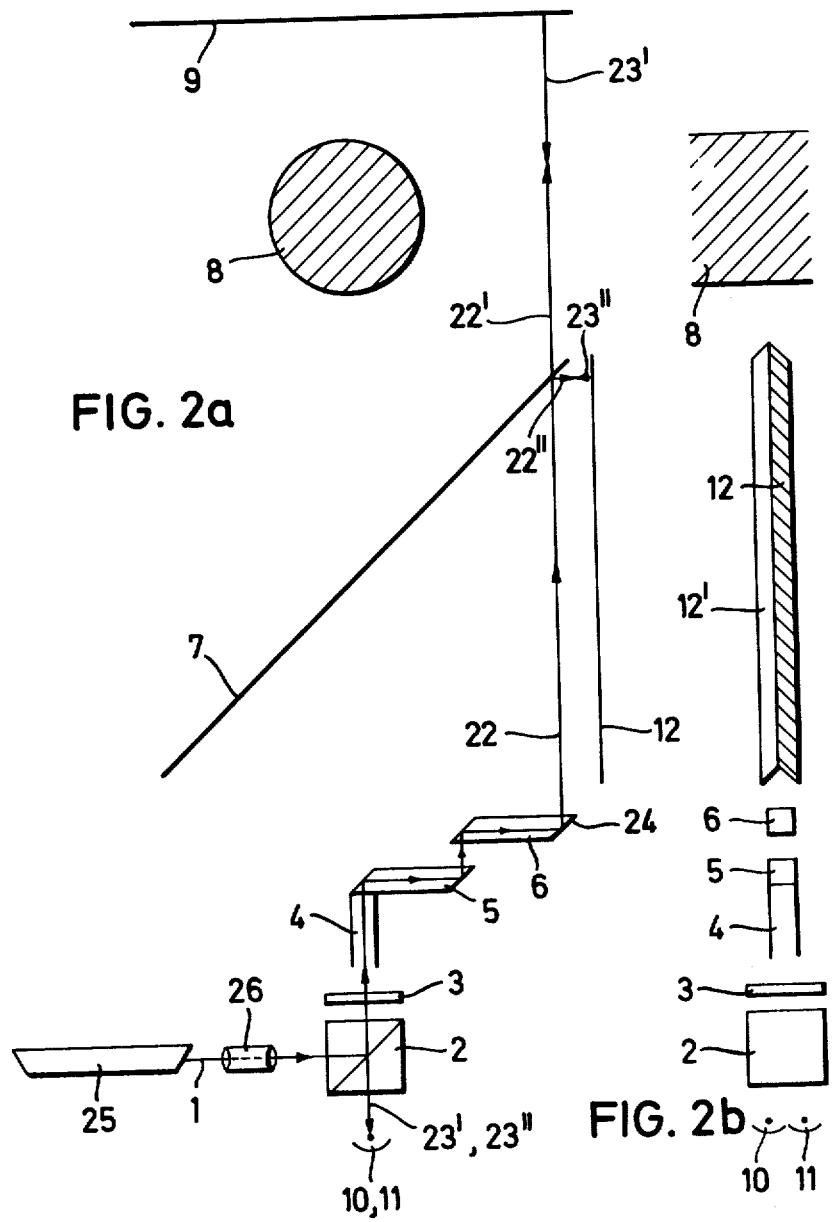

OPTICAL SCANNER

The invention relates to an optical scanner and, more particularly, to such an optical scanner with a light beam reciprocated parallel to itself. Such scanners can serve, for example, for contactless measurement of the dimensions, especially the thickness, of workpieces by means of a narrow light beam which is moved parallel to itself and transversely to the workpiece, the latter interrupting impingement of the light beam upon a photosensitive element.

In this regard, the following considerations are taken into account. It is advantageous to measure the dimensions of a workpiece while it is in a machine tool. In this regard, it is advantageous to effect the measuring operation continuously or to repeat it at brief intervals of time. Moreover, it is advantageous to effect the measuring operation without any mechanical contact between the measuring device and the workpiece. Wear of the measuring device, which would otherwise result in inaccuracies, is thereby avoided. Furthermore, markings by the measuring device upon the workpiece are additionally avoided.

The foregoing general method and means of measuring with a narrow light beam has become known heretofore. If the light beam is moved parallel to itself and if the speed thereof is known and the light beam is intercepted or blocked, if it passes the workpiece, then the time during which the light beam is blanked out by the workpiece, multiplied by the speed of the light beam, is a measure of the dimension of the workpiece. A device for such a measuring operation has become known heretofore, however it is very costly because, in order to attain an accurate result, many of the functions of the device must be carried out very exactly and accurately. In particular, the movement of the light beam must be exactly parallel to itself. Also, the speed of movement must be exact and uniform, and the measurement of the time must be carried out very accurately.

It is accordingly an object of the invention to provide an optical scanner having a measuring accuracy that is at least equal to that of heretofore known devices of this general type but which will also be more compact and less costly to manufacture because only a small number of the parts thereon must be exact.

It is a further object of the invention to provide such an optical scanner which does not require exact time determination or absolute uniformity of the movement of the light beam.

With the foregoing and other objects in view, there is provided, in accordance with the invention, an optical scanner with a light beam reciprocated parallel to itself comprising a stationary inlet for the light beam, an elongated first prism having a parallelogram shape disposed downstream from the stationary inlet in travel direction of the light beam, the first prism extending transversely to the light beam and having an inlet end through which the light beam is admitted to the first prism and twice reflected therein, the first prism having an outlet end from which the light beam leaves the first prism in a direction parallel to the direction in which it is admitted through the inlet end to the first prism, a second prism similar to the first prism having an inlet end disposed downstream of the outlet end of the first prism in travel direction of the light beam, the second prism having an outlet end determining a respective location for the light beam leaving the scanner during a scanning operation, a first rotating carrier for the first prism having a mathematical rotary axis extending in the same direction as that of the light beam being admitted to the first prism through the inlet end of the first prism, and a second carrier rotating at the same rotary speed as the first carrier and counter thereto, the second carrier having a mathematical rotary axis extending in the same direction as that of the light beam leaving the first prism through the outlet end of the first prism and rotating together with the outlet end of the first prism about the rotary axis of the first rotating carrier.

In accordance with another feature of the invention, the optical scanner includes a rotatably driven rotary shaft whereon the first rotating carrier is mounted, a rotary shaft for the second rotating carrier disposed on the first carrier, a first gear concentric to the rotary shaft of the first carrier and mounted thereon fixed against rotation relative thereto, a second gear having half the number of teeth of the first gear and mounted on the rotary shaft for the second carrier between the second carrier and the first carrier, the second gear being fixed to the rotary shaft of the second carrier against rotation relative to the second carrier, and a pinion loosely mounted on the first carrier and having an axis extending parallel to the rotary shafts for the first and second starting carriers, the pinion being in meshing engagement with the first and the second gears.

In accordance with a further feature of the invention, the rotary shafts for the first and second rotating carriers are of hollow construction for passage of the light beam therethrough.

In accordance with an added feature of the invention, the optical scanner includes a holding frame for holding the rotary shaft for the first rotating carrier, the holding frame underlying both the first and the second rotating carriers, the first prism being mounted on a side of the first rotating carrier facing toward the holding frame, and the second prism being mounted on a side of the second rotating carrier facing away from the holding frame.

In accordance with an added feature of the invention, the rotating carriers with the respective prisms are counterweighted like flywheels.

In accordance with yet another feature of the invention, there is provided an optical scanner assembly for contactless measurement of dimensions of a workpiece with a narrow light beam displaceable parallel to itself and transversely to the workpiece, the workpiece being disposed so as to interrupt impingement of the light beam on a photosensitive detector, comprising an optical scanner having an optical path defined by a pair of rotatable prisms with a stationary inlet for the light beam and having a reciprocating outlet through which the light beam emerges for scanning the workpiece, a stationary plane mirror disposed at a side of the workpiece opposite that at which the light beam outlet is located for reflecting the light beam to the reciprocating outlet except where the light beam is interrupted by the workpiece, so that the light beam is reversed in travel direction along the optical path and emerges from the stationary inlet, and photosensitive detector means for obtaining impingement thereon of the reversed light beam.

In accordance with yet an additional feature of the invention, the optical scanner assembly includes a stationary semireflecting beam splitter disposed at an inclination to the optical path of the optical scanner between the optical path and the location of the workpiece, for dividing the light beam into a first partial beam which passes through the beam splitter, senses the workpiece and, after being reflected from the stationary plane mirror, passes anew through the beam splitter and returned to the reciprocating outlet of the beam path, and a second partial beam reflected from the beam splitter and sensing a reflecting grating and, after being reflected from the grating, being reflected anew at the beam splitter and then returned to the reciprocating outlet of the beam path.

In accordance with another feature of the invention, the reflecting grating has a mirror associated therewith for imparting to the returned second partial beam a small lateral offset with respect to the returned first partial beam, the photosensitive detector means comprising two mutually adjacent photosensitive elements for receiving separate impingement thereon of both the returned first and second partial beam after they have travelled back through the optical path, the quarter wave plate and the optical cube.

In accordance with yet a further feature of the invention, the optical scanner assembly includes an optical device for splitting the light beam disposed forward of the stationary inlet for the light beam, the optical device comprising an optical cube having a semireflecting diagonal surface, and a quarter wave plate disposed between the optical cube and the stationary inlet.

In accordance with yet an added feature of the invention, the optical scanner assembly wherein the stationary inlet has an optical axis, includes means for providing a source of the light beam forward of the optical cube and for directing the light beam perpendicularly to the optical axis of the stationary inlet, the photosensitive detector means being disposed at a side of the optical cube opposite the side at which the stationary inlet is located and having an axis aligned with the optical axis of the stationary inlet.

In accordance with yet a further feature of the invention, the optical scanner assembly includes a laser device for producing the narrow light beam as a laser beam.

In accordance with a concomitant feature of the invention, the optical scanner assembly includes a collimator disposed downstream of the laser device in travel direction of the laser beam.

Other features which are considered as characteristic for the invention are set forth in the appended claims.

Although the invention is illustrated and described herein as embodied in optical scanner, it is nevertheless not intended to be limited to the details shown, since various modifications and structural changes may be made therein without departing from the spirit of the invention and within the scope and range of equivalents of the claims.

Figure 3B:
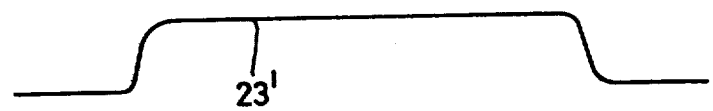

The construction and method of operation of the invention, however, together with additional objects and advantages thereof will be best understood from the following description of specific embodiments when read in connection with the accompanying drawings, in which:

FIGS. 1a and 1b are, respectively, a partly diagrammatic vertical sectional view and a top plan view of an embodiment of the optical scanner constructed in accordance with the invention;

FIGS. 2a and 2b are diagrammatic and schematic front and side elevational views, respectively, of the optical scanner of FIGS. 1a and 1b forming part of an augmented assembly, and depicting the operation thereof for measuring the thickness of workpieces; and FIGS. 3a and 3b are views of the recordings of two polarized split beams formed in the optical scanner upon the two photodetectors thereof.

Referring now to the drawing and first, particularly, to FIGS. 2a and 2b thereof, there is shown a plane polarized output beam 1, for example, from a 2 mW He-Ne laser 25, which passes through a collimator 26 and reaches an optical cube or polarizing beam splitter 2, the beam 1 being reflected from the half-reflecting diagonal surface of the beam splitter 2. The half-reflected beam then passes through a quarter-wave plate 3, becoming circularly polarized thereby. If ambient light conditions cause any difficulties, a red filter can be interposed, additionally. The laser beam then proceeds through a hollow rotary shaft 4. The hollow rotary shaft 4 is simultaneously a stationary or fixed input or inlet for the laser beam.

With respect to the following, reference is now made to FIGS. 1a and 1b. The rotary shaft 4 is mounted in a holding frame 13 and rotatingly driven by a motor 15 and a belt drive 14. The rotary shaft 4 carries, at the top thereof, as viewed in FIG. 1a, a first rotating carrier 17 to which a parallelogram-shaped first prism 5 is fastened. A hollow rotary shaft 19, which carries a second rotating carrier 18, is disposed on the first carrier 17. A parallelogram-shaped prism 6 is fastened to the second carrier 18. A gear 20 is connected to the second carrier 18, rotatably locked therewith i.e. so as to rotate in unison therewith. The gear 20 has half as many teeth as does a gear 16 which is seated on the holding frame 13. A loosely mounted pinion 21 (FIG. 1b) is located on the first carrier 17 and meshes with the gears 16 and 20. A result of this construction is that the output end 24 of the prism 6 reciprocates in a wide range of the total movement, the carriers 17 and 18 being driven in contrarotation so that the scanner output describes a linear sweep in simple harmonic motion.

The laser beam enters the inlet end of the prism 5 after passing through the hollow rotary shaft 4, is reflected twice, leaves the outlet end of the prism 5 and enters the inlet end of the prism 6, is also reflected twice there and leaves the outlet end 24 as a reciprocated beam 22.

Both carriers 17 and 18 are counterbalanced like flywheels, and brief imperfections in the reciprocation of the beam 22 are thereby equalized. Longer deviations from the reciprocating action or long term drift do not affect the accuracy of the measuring system as will be apparent hereinafter.

The beam 22, as shown in FIG. 2a, travels from the outlet end 24 to a stationary beam splitter 7, such as a piece of glass optically flat on both sides thereof, whereat it is split into an onwardly travelling partial beam 22′ and a reflected partial beam 22″. The partial beam 22′ passes through a workpiece 8, is reflected from a plane mirror 9 and returns as a beam 23′. The reflected partial beam 22″ falls or impinges on a reflecting scale or retroreflector 12 with an additional plane mirror 12′ (FIG. 2b) and is, in turn, reflected therefrom as a partial beam 23″. The additional mirror 12′ effects a given lateral shift or offset, so that the returning partial beam 23″, in addition to the returning partial beam 23′, travels backwards through the optical line formed by the prisms 5 and 6 and finally exits from the optical cube or beam splitter 2. The beams 23′ and 23″ then reach the photodetectors 10 and 11. Due to the hereinaforedescribed polarization effect, an undisturbed or undistorted travel or course of the beam 1 produced by the laser device 25 and the beams 23' and 23" is produced.

The beam splitter 7 and the plane mirror 9 must be optically flat or smooth. A non-illustrated slit diaphragm can be introduced additionally in the path of the partial beam 23'. The mirror device 12, 12' advantageously has a scale graduation that is considerably greater than the beam diameter.

FIGS. 3a and 3b show the pulses of the beam 23" produced by the mirror and scale or grating assembly 12, 12' upon the photodetector 11. It is readily apparent that the pulses become lengthened or are wider at the ends or extremes of the sweep or reciprocating movement of the outlet end 24. This depends upon the manner of producing the reciprocation or scan. Because the duration of successive pulses is not constant, the extremes of the beam sweep or reciprocating movement are not employed so that simple linear interpolation is accurate. For the measurement described herein, therefore, no inaccuracy is produced thereby. In a similar manner, a plot or pulse record is produced from the photodetector 10; note in FIG. 3b the curve of the beam 23'. This curve results from the interruption of the laser beam by the workpiece 8 and is picked up or recorded in the same manner as is the curve of the beam 23'. The diameter of the workpiece 8 is determined by counting the number of complete "scale" or grating pulses during the interruption period recorded from the photodetector 10 plus the partial scale or grating pulses at each end or extremity of the plot or record thereof.

The optical scanner according to the invention has the following advantages:

The scanner speed need not be accurately maintained, since it takes effect in a similar manner both when scanning the workpiece and scanning the scale or grating.

The laser is used as more than just an intense light source, but any other intense light source may be used instead of a laser.

The optics used are plane optics throughout, which can be readily produced with great accuracy.

The entire system is very simple and has no special components except for the scanner per se.

Only a plane mirror is disposed behind the workpiece.

For ensuing control of the machine, it is necessary only to interchange the plane mirror 9 and the scale 12, 12'.

The system is readily suited for measurement in two planes.

Inaccuracies or imperfections of scanning are equalized or smoothed out by the flywheel effect thereof.

The only components which require construction with great accuracy are the scale or grating 12, 12', the prisms 5 and 6, the beam splitter or semireflector 7 and the plane mirror 9.

There are claimed:

1. Optical scanner with a light beam reciprocated parallel to itself comprising a stationary inlet for the light beam, an elongated first prism having a parallelogram shape disposed downstream from said stationary inlet in travel direction of the light beam, said first prism extending transversely to the light beam and having an inlet end through which the light beam is admitted to said first prism and twice reflected therein, said first prism having an outlet end from which the light beam leaves said first prism in a direction parallel to the direction in which it is admitted through said inlet end to said first prism, a second prism similar to said first prism having an inlet end disposed downstream of said outlet end of said first prism in travel direction of the light beam, said second prism having an outlet end determining a respective location for the light beam leaving the scanner during a scanning operation, a first rotating carrier for said first prism having a mathematical rotary axis extending in the same direction as that of the light beam being admitted to said first prism through said inlet end of said first prism, and a second carrier rotating at the same rotary speed as said first carrier and counter thereto, said second carrier having a mathematical rotary axis extending in the same direction as that of the light beam leaving said first prism through said outlet end of said first prism and rotating together with said outlet end of said first prism about said rotary axis of said first rotating carrier.

2. Optical scanner according to claim 1 including a rotatably driven rotary shaft whereon said first rotating carrier is mounted, a rotary shaft for said second rotating carrier disposed on said first carrier, a first gear concentric to said rotary shaft of said first carrier and mounted thereon fixed against rotation relative thereto, a second gear having half the number of teeth of said first gear and mounted on said rotary shaft for said second carrier between said second carrier and said first carrier, said second gear being fixed to said rotary shaft of said second carrier against rotation relative to said second carrier, and a pinion loosely mounted on said first carrier and having an axis extending parallel to said rotary shafts for said first and second rotating carriers, said pinion being in meshing engagement with said first and said second gears.

3. Optical scanner according to claim 2 wherein said rotary shafts for said first and second rotating carriers are of hollow construction for passage of the light beam therethrough.

4. Optical scanner according to claim 3 including a holding frame for holding said rotary shaft for said first rotating carrier, said holding frame underlying both said first and said second rotating carriers, said first prism being mounted on a side of said first rotating carrier facing toward said holding frame, and said second prism being mounted on a side of said second rotating carrier facing away from said holding frame.

5. Optical scanner according to claim 4 wherein said rotating carriers with the respective prisms are counterweighted.

6. Optical scanner assembly for contactless measurement of dimensions of a workpiece with a narrow light beam displaceable parallel to itself and transversely to the workpiece, the workpiece being disposed so as to interrupt impingement of the light beam on a photosensitive detector, comprising an optical scanner having an optical path defined by a pair of rotatable prisms with a stationary inlet for the light beam and having a reciprocating outlet through which the light beam emerges for scanning the workpiece, a stationary plane mirror disposed at a side of the workpiece opposite that at which the light beam outlet is located for reflecting the light beam to said reciprocating outlet except where the light beam is interrupted by the workpiece, so that the light beam is reversed in travel direction along said optical path and emerges from said stationary inlet, and photosensitive detector means for obtaining impingement thereon of the reversed light beam.

7. Optical scanner assembly according to claim 6 including an optical device for splitting the light beam disposed forward of said stationary inlet for the light beam, said optical device comprising an optical cube having an semireflecting diagonal surface, and a quarter wave plate disposed between said optical cube and said stationary inlet.

8. Optical scanner assembly according to claim 7 wherein said stationary inlet has an optical axis, and including means for providing a source of the light beam forward of said optical cube and for directing the light beam perpendicularly to said optical axis of said stationary inlet, said photosensitive detector means being disposed at a side of said optical cube opposite the side at which said stationary inlet is located and having an axis aligned with said optical axis of said stationary inlet.

9. Optical scanner assembly according to claim 8 including a stationary semireflecting beam splitter disposed at an inclination to said optical path of said optical scanner between said optical path and the location of the workpiece for dividing the light beam into a first partial beam which passes through said beam splitter, senses the workpiece and, after being reflected from said stationary plane mirror, passes anew through said beam splitter and returned to said reciprocating outlet of the beam path, and a second partial beam reflected from said beam splitter and sensing a reflecting grating and, after being reflected from said grating, being reflected anew at said beam splitter and then returned to said reciprocating outlet of the beam path.

10. Optical scanner assembly according to claim 9 wherein said reflecting grating has a mirror associated therewith for imparting to the returned second partial beam a small lateral offset with respect to the returned first partial beam, said photosensitive detector means comprising two mutually adjacent photosensitive elements for receiving separate impingement thereon of both said returned first and second partial beams after they have travelled back through said optical path, said quarter wave plate and said optical cube.

11. Optical scanner assembly according to claim 6 including a laser device for producing the narrow light beam as a laser beam.

12. Optical scanner assembly according to claim 11 including a collimator disposed downstream of said laser device in travel direction of the laser beam.

13. Apparatus for measuring a dimension of a workpiece, comprising means for generating a light beam, scanning means for causing the light beam to move in a scanning motion transversely and extend parallel to the original direction thereof, beam splitting means having a planar surface for splitting the light beam during scanning into a first beam component and a second beam component, reflecting means having a planar surface and being disposed for scanning by the first beam component to provide a reflected return beam, workpiece locating means for locating a workpiece between the reflecting means and the incidence of the scanning first beam component, a planar reflective grating disposed for scanning by the second beam component to provide a return beam formed of periodic reflected components, photodetector means for detecting reflected first and second beam components in the form of a first time base for the first reflected beam component and periodic signal functions on a second time base for the second reflected beam component, whereby interception of the first scanning beam component by a workpiece is detected in the form of a signal length function on the first time base, said scanning means comprising an optical scanner with a light beam reciprocated parallel to itself, including a stationary inlet for the light beam, an elongated prism having a parallelogram shape disposed downstream from said stationary inlet in travel direction of the light beam, said prism extending transversely to the inlet travel direction of the light beam and having an inlet end through which the light beam is admitted to the prism and twice reflected therein, said prism having an outlet end from which the light beam leaves said prism in a direction parallel to the direction in which it is admitted through said inlet end to said prism, said prism being pivotable about an axis coincident with the inlet travel direction of the light beam at said inlet end of said prism, said outlet end of said prism determining the respective location for the light beam leaving the prism during optical scanning.

14. Apparatus according to claim 13, wherein the said time bases are linear time bases.

15. Apparatus according to claim 13, wherein the time bases are simple harmonic motion time bases.

16. Apparatus according to claim 15, wherein the main beam of light is a laser beam.

17. Apparatus as claimed in claim 13, wherein said means for generating a light beam are a laser generator.

18. Apparatus according to claim 17, wherein said scanning means are adapted to provide a simple harmonic motion to the light beam.

19. Apparatus according to claim 18, wherein said reflective grating is provided with relatively bright and dark intervals and is adapted alternatingly to reflect the light beam back towards said scanning means and to transmit a light beam therethrough.

20. Apparatus according to claim 19, including means for reflecting said first and second components back to said scanning means so as to emerge therefrom as a stationary beam.

21. Apparatus as claimed in claim 20, including means for polarizing the initial beam between said light generating means and said scanning means.

* * * * *